United States Patent [19]

Prough

[11] 4,182,177
[45] Jan. 8, 1980

[54] SOUND EMISSION LEVEL DETECTION

[75] Inventor: James R. Prough, Glens Falls, N.Y.

[73] Assignee: Kamyr, Incorporated, Glens Falls, N.Y.

[21] Appl. No.: 907,858

[22] Filed: May 19, 1978

[51] Int. Cl.$^2$ .............................................. G01F 23/28
[52] U.S. Cl. ................................................. 73/290 V
[58] Field of Search ............. 73/290 V; 181/124, 125, 181/139

[56] References Cited

U.S. PATENT DOCUMENTS

| Re. 29,435 | 10/1977 | Bergdahl et al. | 73/290 V |
|---|---|---|---|
| 2,668,365 | 2/1954 | Hogin | 73/290 V X |
| 3,079,596 | 2/1963 | Atkinson | 73/290 V X |
| 3,920,155 | 11/1975 | Whited | 73/290 V X |

Primary Examiner—Gerald Goldberg
Assistant Examiner—Joseph W. Roskos
Attorney, Agent, or Firm—Cushman, Darby & Cushman

[57] ABSTRACT

An assembly and method for determining the level of sound absorbing solids in a fluid-filled vessel. A number of sound receivers are mounted at spaced vertical positions to the exterior of the vessel along a generally vertical line, and a sound generator is mounted atop the vessel approximately 180° around the circumference of the vessel from the receivers. The sound waves are intermittently or cyclically generated by the sound generator, they are received by the receivers, and evaluated. For those receivers mounted below the level of the solids, the energy received will be low, while for those mounted above the solids level in the fluid phase of the vessel, the energy received will be high. For cellulosic chips, the receivers are tuned to respond primarily to sound at a frequency of about 3200 Hz. Alternatively, a number of sound generators are mounted at spaced vertical positions along the vessel, and a single receiver is mounted in operative association with the vessel fluid phase, the generators being selectively actuated for given time periods, and the receiver output being displayed relative to each generator actuation.

27 Claims, 6 Drawing Figures

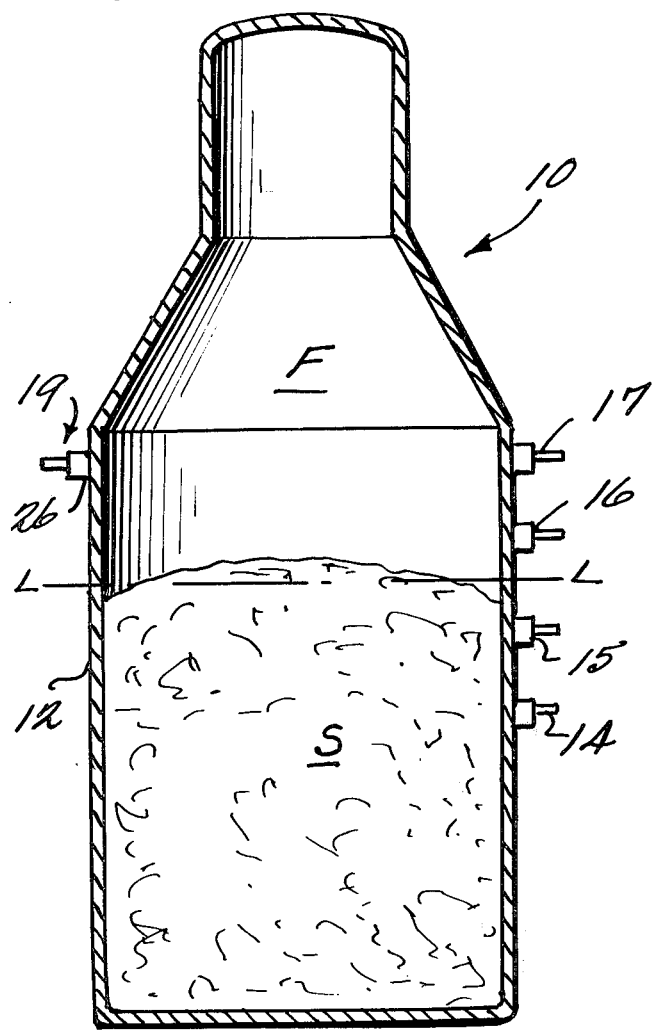
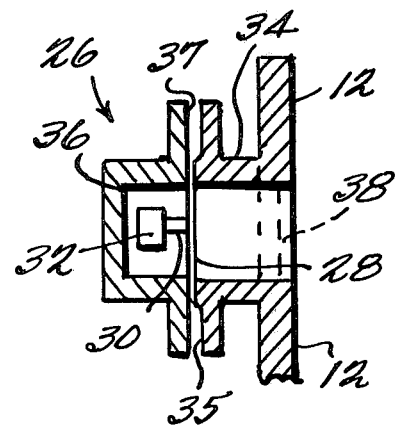
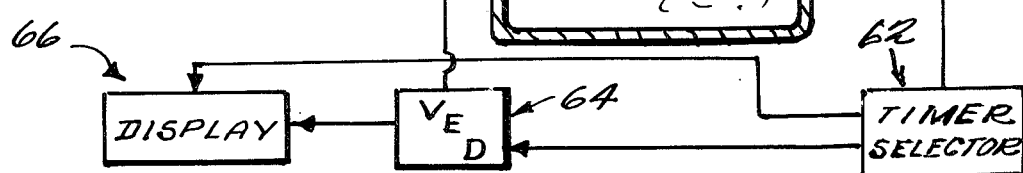

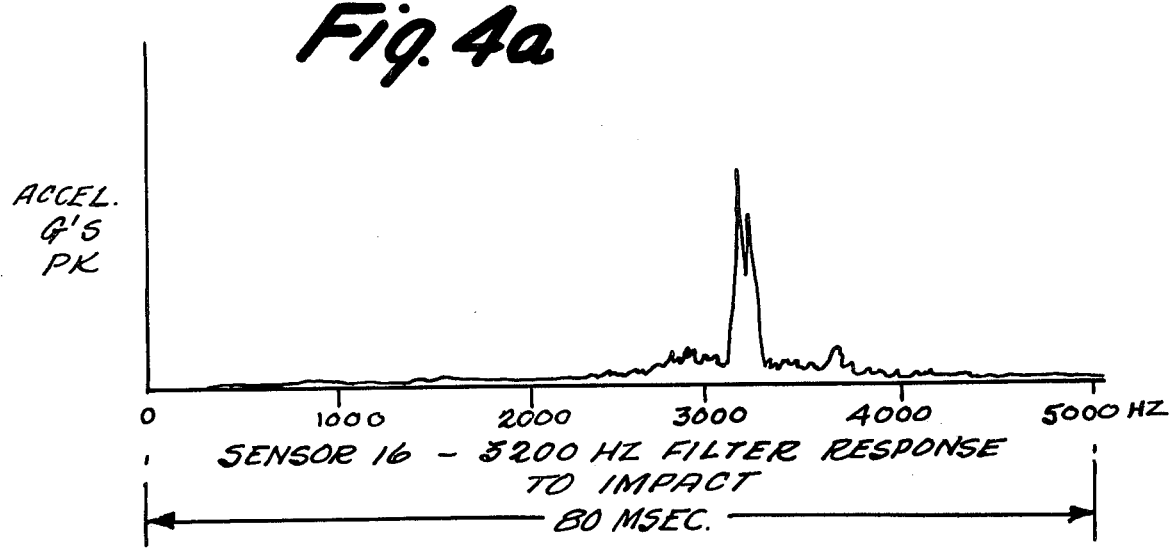
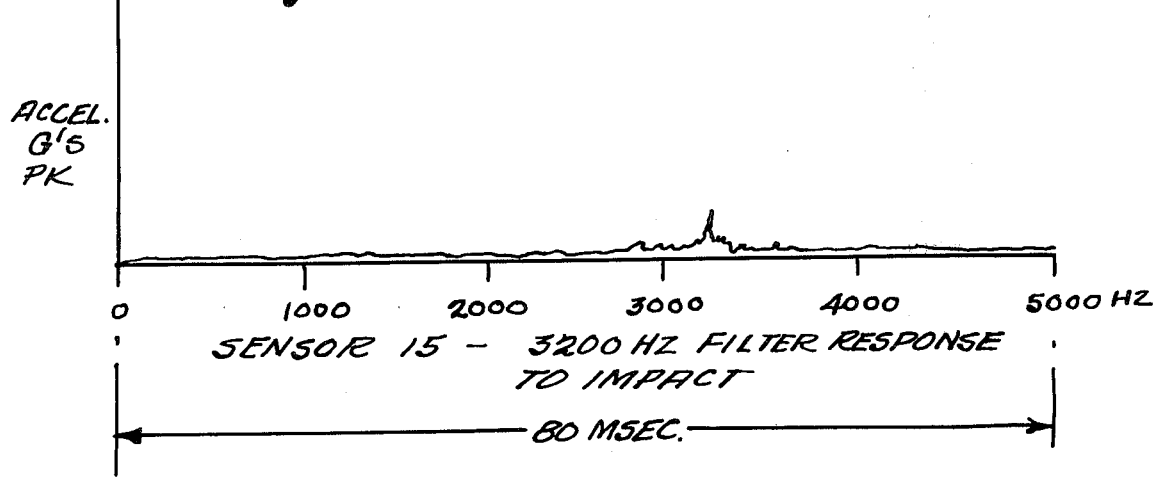

SOUND EMISSION LEVEL DETECTION

BACKGROUND AND SUMMARY OF THE INVENTION

The determination of solids level in process vessels can be difficult and expensive. This is especially so in liquid-filled continuous conventional cellulosic chips digesters, such as shown in U.S. Pat. No. 3,579,421. Commercially available techniques for detecting such chips levels are not entirely successful. It is not possible to detect the level by density difference since the density of the chip mass and that of the liquors to similar, and various mechanical structures that are utilized are expensive to construct and to install, and once installed are difficult to maintain.

According to the present invention, a method and apparatus are provided that can determine the solids level in fluid-filled vessels, particularly continuous pulp digesters, that are relatively easy to construct, install, and maintain and can determine the solids level within the necessary degree of accuracy for such process vessels. The invention is based on the fact that the solids are sound absorbing while the fluid in the fluid phase is sound transmitting. The level of solids is then indicated by the difference in energy pick-up between any two consecutive receivers that are vertically spaced along the vessel wall, or the difference in energy picked up by a single receiver in response to the sequential actuation of two consecutive generators that are vertically spaced along the vessel.

According to the present invention, a solids level detecting assembly is provided comprising a fluid-filled vessel adapted to have sound absorbing solid particles flowing downwardly therein with a sound conducting fluid in a fluid phase above the level of solids, and having a generally vertical axis; a plurality of sound receivers mounted at spaced vertical positions to the exterior of the vessel; means for periodically generating sound waves in the fluid phase of the vessel above the level of solids particles; and means for evaluating the sound energy received by the receivers in response to the generated sound waves to determine the level of solids relative to two or more of the receivers. The sound generating means is preferably mounted on the exterior of the vessel substantially 180° around the circumference of the vessel from the vertical line of sound receivers, and the generating means may comprise a vessel impacter or means for electrodynamically vibrating the vessel, such sound generating means acting at a fluid phase portion of the vessel. Alternatively, the sound generating means may generate sound within the fluid in the vessel fluid phase, such as by providing a diaphragm in contact with the fluid, which diaphragm is accessible from the vessel exterior, however, for ready maintenance. The receivers and sound generator can all be mounted to the exterior of the vessel with the vessel in operation, thereby making the installation simple even for retrofitting.

Preferably, a filter is associated with the receivers and the evaluating means for reducing the response of all sound received by the receivers except that sound at a particular predetermined frequency most suited for the particular vessels and solids involved. For liquor-filled continuous cellulosic chips digesters, it has been found that the optimum frequency that will be absorbed by the chips is about 3200 Hz. The receiver is tuned to view only sound at such an output, and the sound generating means can also be provided to emit sound at that particular frequency. A tuner and output display can be associated with each receiver, however, in order to save on equipment expense, it is preferred that the evaluating means include timing means for cyclically sampling each receiver output in turn with a band pass filter disposed in the output from the timing means for filtering the receiver output, a vibration envelope detector for detecting the peak of the receiver output, and a single display means for displaying the peak detected by the detector for each receiver in turn. The display means preferably complies as a multi-channel chart recorder, although a number of indicator lights or other appropriate instrumentation may be provided.

Alternatively, the detecting assembly includes a plurality of sound generators mounted at spaced vertical positions along the vessel, a single sound receiver mounted in operative association with the fluid phase of the vessel, above the level of solids, and means for evaluating the sound energy received by the receiver in response to the generated sound waves to determine a level of solids relative to two or more of the sound generators. Timing means are provided for cyclically actuating each of the sound generators in turn. The sound receiver, which preferably comprises an accelerometer, utilizes a vibration envelope detector for detecting the peak of accelerometer output in response to each sequential actuation of a generator, and for displaying the peak detected by the detector for each generator.

According to the method of the present invention, it is possible to determine the level of sound absorbing solids in a sound conducting fluid-filled vessel having a fluid phase above the level of solids. The method comprises the steps of providing a plurality of sound receivers at spaced vertical positions along the vessel; periodically generating sound waves in the fluid phase portion of the vessel above the solids level; receiving sound energy with the receivers in response to the generated sound waves; and evaluating the sound energy received to determine the level of solids relative to two or more of the sound receivers. For the receivers below the solids level, the sound energy received will be low, while for the receivers above the solids level, the sound energy received will be high, the solids level being readily determined to be between adjacent sound receivers that have low and high energy received thereby. The sound waves may be generated cyclically or intermittently, by acting on the vessel itself or by generating sound with the fluid of the fluid phase.

When a plurality of generators are utilized, and a single receiver, for the generators below the solids level, the sound energy received by the receiver will be low, while for the generators above the solids level, the sound energy received by the receiver will be high, the solids level being readily determined to be between the adjacent sound generators that result in low and high energy being received by the receiver.

It is the primary object of the present invention to provide a practical manner of detecting the level of solids in a process vessel, particularly the level of cellulosic chips in a continuous digester. This, and other objects of the invention, will become clear from an inspection of the detailed description of the invention, and from the appended claims.

BRIEF DESCRIPTION OF THE DRAWINGS

FIG. 1 is a diagrammatic cross-sectional view of a conventional continuous cellulosic chips digester having exemplary solids level detecting means according to the present invention associated therewith;

FIG. 2 is a detailed cross-sectional view of an exemplary sound generating means useful with the vessel of FIG. 1;

FIGS. 4a and 4b are graphs to the same scale illustrating the difference in energy level received by receivers above and below the solids level; and FIG. 5 is a schematic view similar to that of FIG. 1 only illustrating an embodiment utilizing a plurality of generators and a single receiver.

DETAILED DESCRIPTION OF THE DRAWINGS

Figure 3:
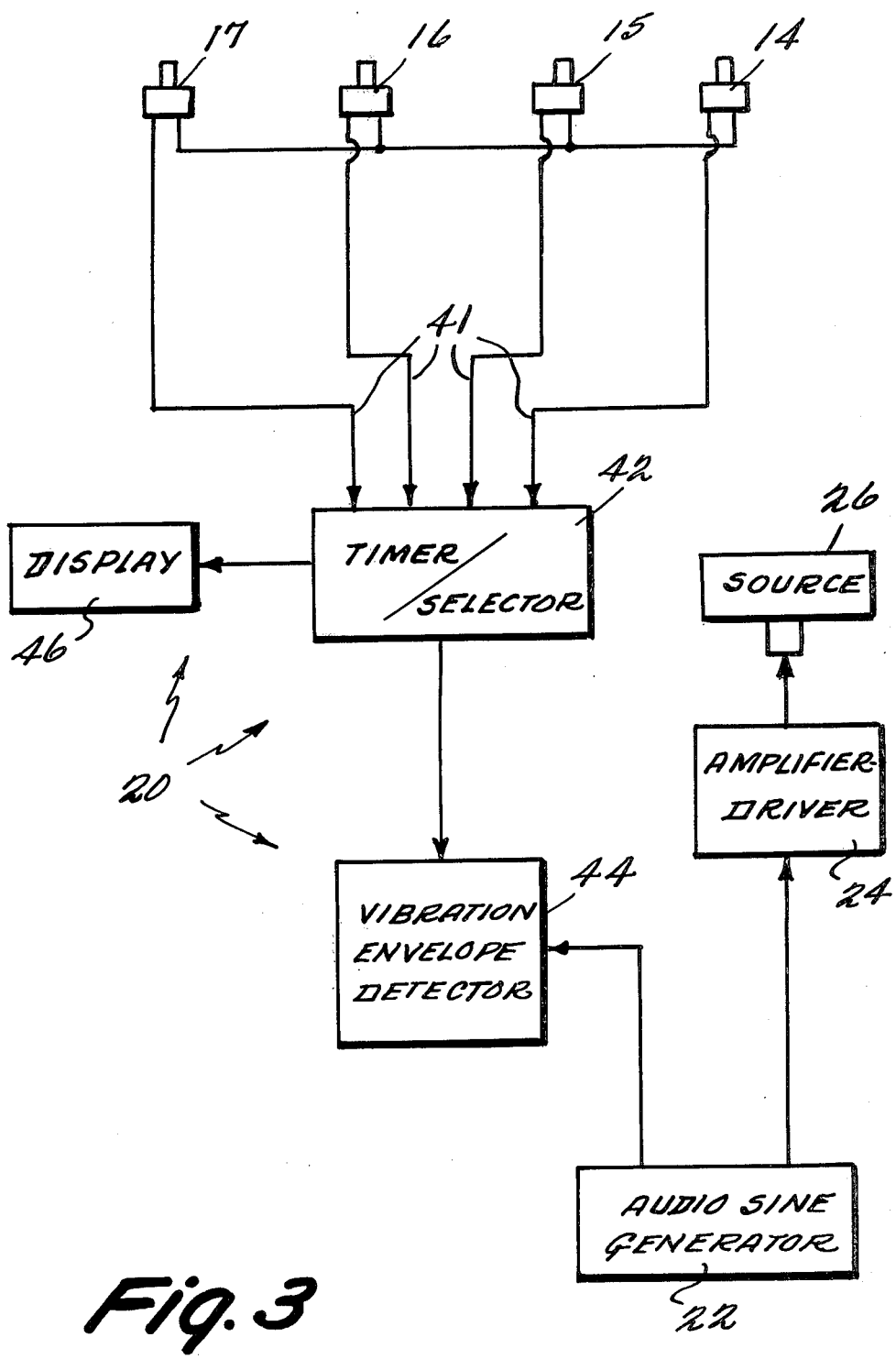
FIG. 3 is a schematic view illustrating the interrelationship between exemplary components useful in practicing the present invention.

A solids level detecting assembly according to the invention is illustrated schematically in the drawings. The assembly includes a fluid-filled vessel 10 adapted to have sound absorbing solids S flowing downwardly therein with the sound conducting fluid in a fluid phase F above the level of solids, and having a generally vertical axis. An exemplary form such a vessel 10 can take is a conventional continuous cellulosic chips digester, such as shown in U.S. Pat. No. 3,579,421. The vessel 10 has a circumferentially extending vessel wall 12, and a plurality of sound receivers—shown at 14, 15, 16, and 17 in FIGS. 1 and 3—are mounted at spaced vertical positions to the exterior of the vessel 10 on the wall 12, the receivers 14 through 17 preferably being disposed in a substantially vertical line. The assembly also includes means 19 for periodically generating sound waves in a fluid phase F of the vessel 10 above the level L of solids, and means 20 (see FIG. 3) for evaluating the sound energy received by the receivers 14 through 17 in response to generated sound waves to determine the level of solids L relative to two or more of the receivers 14 through 17.

The sound generating means 19 can be selected from a number of commercially available alternatives. The sound generating means 19, as illustrated schematically in FIG. 3, preferably includes an audio sine generator 22, an amplifier/driver 24, and a vibration exciter 26, the exciter being mounted directly on the exterior of the vessel wall 12 at a portion of the wall 12 that is in the fluid phase F of the vessel 10 (i.e., adjacent the top of the vessel 10). The vibration exciter may comprise an impacter for impacting the vessel wall 12, or an electrodynamic vibrator. Where such exciters are used—or other exciters which provide combined fluid-borne and structure-borne excitation—differentiation must be provided between the structure carried and liquor carried received sound. This is easily accomplished by mounting the exciter 26 on the wall 12 substantially 180° around the vessel circumference of a vertical line extending between the receivers 14 through 17.

An exemplary exciter 26' is illustrated schematically in FIG. 2 that will provide only fluid-borne excitation. Such an exciter 26' may comprise a metal diaphragm 28 of the like in contact with the fluid in the vessel fluid phase F, but mounted so that it is accessible from the exterior of the vessel 10. An operator 30 and exciter 32 are provided, the exciter 32 being connected to the amplifier/driver 24, and blind-threaded to a raised center section of the diaphragm 28. Means for mounting the diaphragm 28 in contact with the fluid would preferably include a pipe 34 in fluid communication with the vessel interior and extending outwardly therefrom, the diaphragm 28 being sandwiched between an exterior seat 35 of the pipe 34 and a seat 37 of a cap 36 enclosing the exciter 32, the seats 35 and 37 being releasably attached together. In order to allow replacement of the diaphragm 28 or other components of the assembly 26' without interrupting the process in the vessel 10, a valve means 38, such as a gate or ball valve, may be provided to selectively provide or prevent fluid communication between the interior of the pipe 34 and the interior of vessel 10. The valve means 38 is shown schematically in dotted line in FIG. 2.

The receivers 14 through 17 preferably comprise accelerometers, such as Bruel and Kjaer Type 4344 accelerometers, or PCB, Inc. Model 308A03 accelerometers, or the like. Any number of accelerometers, may be provided, although for use with a continuous digester, it is desirable to merely include four accelerometers 14 through 17, the upper accelerometer 17 mounted near the digester top so that it is always above the chip maximum height, the lowest accelerometer 14 at a level that approaches the "danger" condition for process quality, and intermediate accelerometers 15 and 16 evenly dividing the distance between the units 14, 17, it being desired that the chip level L would normally be above the accelerometer 15 and below the accelerometer 16. The accelerometers will be mounted to the wall 12 in any suitable manner, as by stud mounting them to drilled and tapped steel blocks welded to the wall 12. An accelerometer power supply 40 (see FIG. 3) is located in a sheltered area near the accelerometers 14 through 17, and cables 41 interconnect the accelerometers 14 through 17 with the evaluating means 20.

The evaluating means 20 preferably are mounted in a control room remote from the vessel 10. The means 20 may include a tuning mechanism and an output recorder or the like associated with each accelerometer 14 through 17, however, in order to save on equipment costs without affecting the accuracy of the determinations there may be provided a timer selector 42 associated with a single filtering means 44 and display means 46. The means 44 preferably includes a Shaker Research vibration envelope detector with a band pass filter, for detecting the peak of the data passed from the timer 42, the output from the detector 44 being directed by the timer 42 to the appropriate channel of a four channel chart recorder which comprises the display means 46. The display means 46 can also comprise a wide variety of other instrumentation, such as a plurality of indicator lights. The timer 42 may comprise a mechanical timer with four separate control cams, the selector sampling accelerometer output over, for example, a ten second time period, each accelerometer output 14 through 17 selected for two seconds, for example, and a print command issuing from the selector 42 through the detector 44 to the chart recorder 46 for putting a dot at an appropriate place on the recorder 46.

The capability of easily discriminating between sound energy levels above and below the solids level L is dependent upon the frequency of the sound, and the optimum frequency may vary depending upon the particular solids, vessel, and the like. For a conventional continuous cellulosic chips digester, the attenuation due to the chip column is significant in the 3200 Hz. range, and instrumentation tuned to that band can discriminate between output differences of receivers mounted above and below the chips level. Spectral analysis and time domain plots indicating the difference in response to generated sound above and below the chip level are illustrated in FIGS. 4a and 4b. The data in FIGS. 4a and 4b would be attained utilizing a 5% band pass filter for reducing the response of all sound received by the receivers 14 through 17 except in the 3200 HZ. frequency range. An impact exciter 26 would be used located 180° from the vertical line between the accelerometers 14 through 17. FIGS. 4a and 4b schematically represent the differences in response that would be detected by the filters 16 and 15 assuming the chip level L was an indicated in FIG. 1. The audio sine generator 22 may also be set to generate sound primarily in the 3200 Hz. frequency range, and be operatively interconnected with the vibration envelope detector 44 for coordinating the emitted and sensed frequency.

According to the embodiment of the present invention illustrated in FIG. 5, a plurality of generators 50, 51, 52, and 53 are mounted at spaced vertical positions along the vessel 12, and a single sound receiver 60 is provided mounted in operative association with the fluid phase F of the vessel, above the level of solids S. Means are provided for evaluating the sound energy received by the receivers 60 in response to the generated sound waves to determine the level of solids relative to two or more of the sound generating means 50–53, such evaluating means including conventional timing means 62 for cyclically actuating each of the sound generating means 50–53 in turn, a vibration envelope detector 64 or the like for detecting the peak of the output from the receiver 60 (i.e., accelerometer), and means 66 for displaying the peak detected by the detector 64. The components 62, 64, and 66 are comparable to the components 42, 44, and 46 illustrated in FIG. 3. Again, the generators 50–53 can be chosen from a variety of conventionally available generators, such as exciters for impacting the vessel wall 12.

The present invention also encompasses a method of determining the level of sound absorbing solids, such as cellulosic chips, in a sound conducting fluid-filled vessel having a fluid phase above the level of solids, such as a continuous digester having digesting liquor disposed above the solids level. The method includes the steps of providing a plurality of sound receivers 14 through 17 at spaced vertical positions along the vessel wall 12, periodically—either cyclically or intermittently—generating sound waves in the fluid phase portion of the vessel 10 above the solids level L, receiving sound energy with the receivers 14 through 17 in response to the generated sound waves, and evaluating the sound energy received to determine the level of solids relative to two or more of the sound receivers 14 through 17. Where the solids is cellulosic chips material and the fluid is chips treating liquor, the receiving step is accomplished by tuning the receivers 14 through 17 to respond primarily to sound at a frequency of about 3200 Hz. The generating step may be accomplished in a variety of manners, such as by impacting the vessel wall 12 at a fluid-phase portion thereof (see FIG. 1); by electrodynamically vibrating the vessel at a fluid-phase portion; or by generating sound within the fluid in the fluid phase of the vessel (i.e., utilizing a diaphragm that is vibrated, or a hydrophone). Especially when the sound is generated by impacting the vessel, the method comprises the further step of differentiating the received sound energy between structure carried and liquor carried energy, which may be accomplished by locating the impacting device 26 at a point about 180° around the vessel circumference from the receivers 14 through 17.

According to another embodiment of the method of the present invention, with particular reference to FIG. 5, a plurality of sound generators 50–53 are provided at spaced vertical positions along the vessel 10, a single receiver 60 is provided in operative association with the fluid phase portion of the vessel above the solids level, sound waves are generated by each of the generators 50–53 in turn, the receiver 60 receiving sound energy in response to the generated sound waves, and the sound energy received from the generators is evaluated to determine the level of solids relative to two or more of the sound generators 50–53. The receiver 60 is tuned to respond primarily to sound at frequency of about 3000–5000 Hz. (e.g., 3200 Hz.) when the solids S is cellulosic chips material and the fluid is chips treating liquor. For the configuration actually illustrated in FIG. 5, when the generator 51 was actuated, the sound received by the receiver 60 and displayed on the display means 66 would be low, and subsequently when the sound generated by the generator 52 were received by the receiver 60, the sound received as displayed on the display 66 would be high. Thus, the inexpensive, would know that the level of solids S was between the adjacent generators 51, 52 from which low and high energy were received.

The components utilized in practicing the present invention are relatively inexpensive, and may be readily installed and maintained since they are located on, or accessible from, the exterior of the vessel 10, and the components may be repaired or replaced without interruption of the continuous processing utilizing the vessel 10. Thus, it will be seen that according to the present invention, a practical method and apparatus for determining the solids level in a fluid-filled vessel has been provided.

While the invention has been herein shown and described in what is presently conceived to be the most preferred and practical embodiment thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A solids level detecting assembly comprising solids flowing downwardly therein with a sound conducting fluid in a fluid phase above the level of solids, and having a generally vertical axis, a plurality of sound receivers mounted at spaced vertical positions to the exterior of said vessel, means for periodically generating sound waves in the fluid phase of the vessel above the level of solids, means for evaluating the sound energy received by said receivers in response to the generated sound waves by evaluating the energy levels of individual frequencies of sound waves to determine the level of solids relative to two or more of said receivers; and a filter associated with said receivers and evaluating means for reducing the response of all sound received by said receivers except that at a particular predetermined frequency.

2. An assembly as recited in claim 1 wherein said vessel is of sound-transmitting material, and wherein said means for periodically generating sound waves is mounted on the exterior of said vessel, and wherein said receivers are mounted in a substantially straight vertical line, and wherein said sound generating means is mounted on said vessel substantially 180° around said vessel of the line extending through said receivers.

3. An assembly as recited in claim 2 wherein said sound generating means comprises means for impacting said vessel at a fluid-phase portion thereof.

4. An assembly as recited in claim 2 wherein said sound generating means comprises means for electrodynamically vibrating said vessel at a fluid-phase portion thereof.

5. An assembly as recited in claim 1 wherein said vessel comprises a continuous pulp digester.

6. An assembly as recited in claim 1 wherein each of said sound receivers comprises an accelerometer.

7. An assembly as recited in claim 6 wherein said evaluating means comprises timing means for cyclically sampling each accelerometer output in turn, a band pass filter disposed in the output from said timing means for filtering accelerometer output, a vibration envelope detector for detecting the peak of the accelerometer output, and means for displaying the peak detected by said detector for each accelerometer in turn.

8. An assembly as recited in claim 7 wherein said displaying means comprises a multi-channel chart recorder.

9. An assembly as recited in claim 7 wherein said displaying means comprises a plurality of indicator lights.

10. An assembly as recited in claim 7 wherein said sound generating means includes an audio generator remote from said vessel, and wherein said audio generator is operatively connected to said vibration envelope detector.

11. An assembly as recited in claim 1 wherein said sound generating means comprises means for generating sound within the fluid in said vessel fluid phase.

12. An assembly as recited in claim 11 wherein said sound generating means comprises a diaphragm, and means for mounting the diaphragm in contact with the fluid in said vessel fluid phase but so that said diaphragm is accessible from exterior of said vessel, and means for vibrating said diaphragm.

13. An assembly as recited in claim 12 wherein said mounting means comprises a pipe in fluid communication with said vessel interior and extending outwardly therefrom, said diaphragm being mounted to a portion of said pipe remote from said vessel.

14. An assembly as recited in claim 13 further comprising valve means disposed in said pipe for selectively providing or preventing fluid communication between the interior of said pipe and said vessel interior.

15. A method of determining the level of cellulosic chips material in a sound-conducting fluid-filled vessel having a fluid phase of chips treating fluid above the level of chips, comprising the steps of
providing a plurality of sound receivers at spaced vertical positions along the vessel,
periodically generating sound waves in the fluid phase portion of the vessel above the chips level,
receiving sound energy with said receivers in response to the generated sound waves by tuning the receivers to respond primarily to sound at a frequency of about 3200 Hz, and
evaluating the sound energy received to determine the level of the chips relative to two or more of the sound receivers.

16. A method as recited in claim 15 wherein the vessel is sound-transmitting, and wherein said step of generating sound waves is accomplished by impacting the vessel at a fluid-phase portion thereof, and wherein said method comprises the further step of differentiating the received sound energy between structure carried and liquor carried.

17. A method as recited in claim 16 wherein said differentiating step is accomplished by impacting the vessel at a point located about 180° around the vessel circumference from a generally vertical line passing through the spaced sound receivers.

18. A method as recited in claim 15 wherein said step of generating sound waves is accomplished by generating sound within the fluid in the fluid phase of the vessel.

19. A method as recited in claim 15 wherein the vessel is sound-transmitting, and wherein said step of generating sound waves is accomplished by electrodynamically vibrating the vessel at a fluid-phase portion thereof.

20. A method as recited in claim 15 wherein said sound is generated cyclically.

21. A method as recited in claim 15 wherein said sound is generated intermittently.

22. A solids level detecting assembly comprising:
a fluid-filled vessel adapted to have sound absorbing solids flowing downwardly therein with a sound conducting fluid in a fluid phase above the level of solids, and having a generally vertical axis,
a plurality of means for generating sound waves mounted at spaced vertical positions along the vessel,
a sound receiver mounted in operative association with the fluid phase of the vessel, above the level of solids,
means for evaluating the sound energy received by said receiver in response to the generated sound waves to determine the level of solids relative to two or more of said sound generating means; and
a filter associated with said receivers and evaluating means for reducing the response of all sound received by said receivers except that at a particular predetermined frequency.

23. An assembly as recited in claim 22 wherein said evaluating means comprises timing means for cyclically actuating each of said sound generating means in turn.

24. An assembly as recited in claim 23 wherein said sound receiver comprises an accelerometer, and wherein said evaluating means further comprises a vibration envelope detector for detecting the peak of the accelerometer output, and means for displaying the peak detected by said detector.

25. An assembly as recited in claim 22 wherein said evaluating means comprises means for evaluating the energy levels of individual frequencies of the sound waves received by the receivers.

26. A method of determining the level of sound-absorbing cellulosic chips material in a sound conducting fluid filled vessel having a fluid phase of chips treating fluid above the level of chips, comprising the steps of:
providing a plurality of sound generators at spaced vertical positions along the vessel, providing a receiver in operative association with the fluid phase portion of the vessel above the chips level, generating sound waves with each of the generators in turn, receiving sound energy with the receiver in response to the generated sound waves by tuning the receiver to sound at a frequency of about 3200 Hz, and evaluating the sound energy received from the generators to determine the level of the chips relative to two or more of the sound generators.

27. A solids level detecting assembly comprising solids flowing downwardly therein with a sound conducting fluid in a fluid phase above the level of solids, and having a generally vertical axis, a plurality of sound receivers mounted at spaced vertical positions to the exterior of said vessel, each of said sound receivers comprising an accelerometer, means for periodically generating sound waves in the fluid phase of the vessel above the level of solids, and means for evaluating the sound energy received by said accelerometers in response to the generated sound waves by evaluating the energy levels of individual frequencies of sound waves to determine the level of solids relative to two or more of said accelerometers.

* * * * *